A. V. ROWE.
BARB WIRE ATTACHMENT FOR GATES.
APPLICATION FILED SEPT. 7, 1918.
1,380,928.
Patented June 7, 1921.
2 SHEETS—SHEET 1.
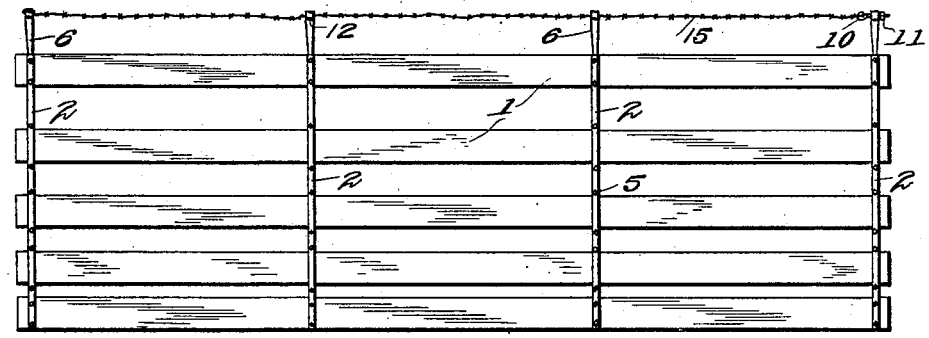
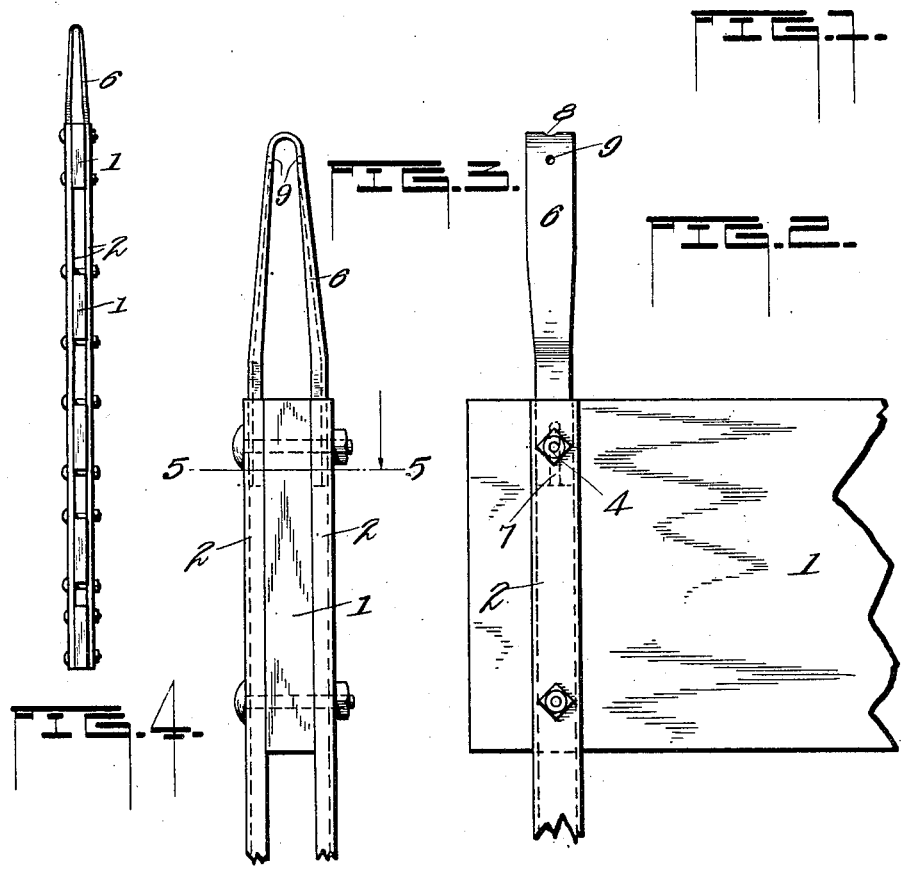
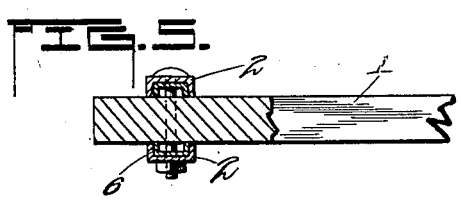

A. V. ROWE.
BARB WIRE ATTACHMENT FOR GATES.
APPLICATION FILED SEPT. 7, 1918.

1,380,928.

Patented June 7, 1921.
2 SHEETS—SHEET 2.

INVENTOR.
Alvin V. Rowe
Chas. H. La Ponte
ATTY

UNITED STATES PATENT OFFICE.

ALVIN V. ROWE, OF GALESBURG, ILLINOIS.

BARB-WIRE ATTACHMENT FOR GATES.

1,380,928.  Specification of Letters Patent.  Patented June 7, 1921.

Application filed September 7, 1918. Serial No. 253,083.

*To all whom it may concern:*

Be it known that I, ALVIN V. ROWE, a citizen of the United States, a resident of Galesburg, in the county of Knox and State of Illinois, have invented new and useful Improvements in Barb-Wire Attachments for Gates, of which the following is a specification.

This invention has reference to a barb-wire attachment for gates.

More particularly the invention relates to a barb-wire attachment for farm-gates constructed of a plurality of spaced longitudinal panels or boards, connected by a plurality of pairs of uprights, made either of channel-irons, or angle-irons; the barb-wire attachment comprising a member connected with the upper ends of each pair of uprights, and upstanding therefrom, to which a stringer of barbed-wire is attached.

That the invention may be more fully understood, reference is had to the accompanying drawings, forming a part of the description, in which,—

Figure 1 is a side elevation of a preferred form of farm-gate with my barb-wire attachment attached thereto;

Fig. 2 is an enlarged detail side elevation showing a part of a board or panel, uprights of channel-iron connected thereto, and a barb-wire attachment member secured by one of the bolts which is used for securing the uprights to said panel or board;

Fig. 3 is an end view of Fig. 2;

Fig. 4 is an end elevation of a gate showing my barb-wire attachments applied thereto;

Fig. 5 is a sectional detail in plan, as the same would appear, if taken on the line 5—5 of Fig. 3, and Figs. 6 to 10, both inclusive, correspond to Figs. 1 to 5 both inclusive, respectively, differing only, in that the uprights are made of angle-iron, instead of channel-iron.

Figure 6:
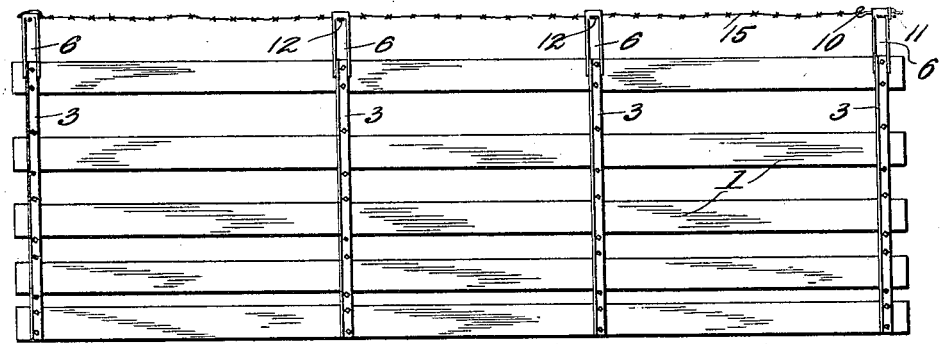
Figures 7, 8:
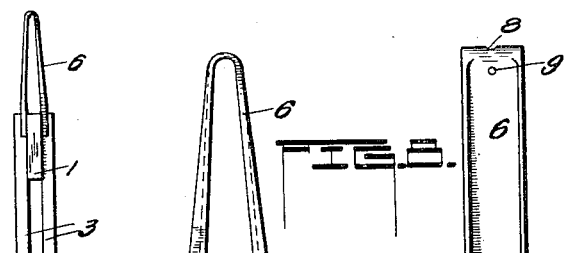
Figure 9:
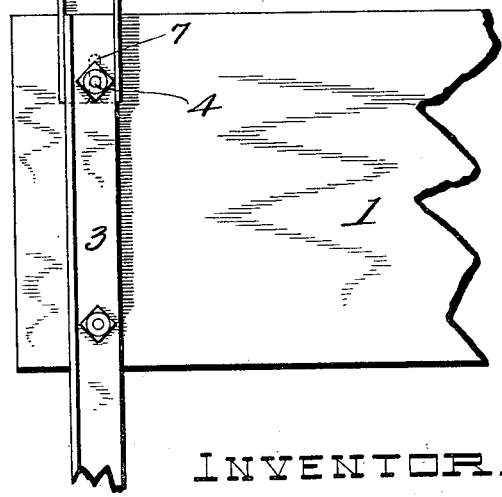
Figure 10:
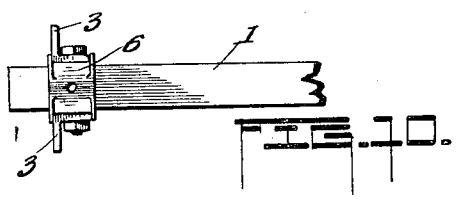

Gates similar to Figs. 1 and 6, with the exception of the barb-wire attachments, are being, and have been manufactured for the trade by applicant for some time, and include the wood panels 1, and the channel-iron uprights 2, shown in Figs. 1 to 5, inclusive, or the angle-iron uprights 3, shown in Figs. 6 to 10, inclusive. These uprights are arranged in pairs, one on either side of the panels or boards 1, bolts 4 and 5 being used for securing the panels or boards, and uprights in assembled relation, the bolts 4 passing through the upper and lower panels or boards 1, and the bolts 5 being disposed adjacent the edges of the boards, as shown. It will be observed that the edges of the channel-irons 2 are turned inwardly to bite into the panels or boards 1.

It has been the practice, until applicant devised the present barb-wire attachment to extend the uprights 2 and 3 up above the top panel or board 1 of the gate, and attach the stringer of barb-wire thereto. Inasmuch as farm-gates of the character shown are made in different sizes, and also, that the gates are made both complete and the irons in a disassembled state, dealers, as well as the lumber-yards dealing in these gates, would necessarily have to carry different height uprights 2 and 3 to meet the demands of their trade. This is costly, wasteful and sometimes quite inconvenient, and the result was a demand for a barb-wire attachment which could be easily adapted to these gates.

6 designates a barb-wire attachment, preferably formed from channel-iron and shaped in the form of an inverted V, except that the upper end is arcuate shaped. When used in connection with channel-irons the channel of the attachment is turned inwardly, and when used in connection with angle-irons the channel is turned outwardly, and in this way when the wire is stretched taut, the angle of the channel will bear against the edges of the angle-bar and will not slip or turn.

The lower ends of the attachment are slotted, as at 7, to permit the ends of the attachment to be slipped down between the uprights 2 or 3, and the panel or board 1, and over the bolts 4; the bolts being first loosened for this purpose and again tightened up.

Passing through the arcuate end of the attachment, is an opening 8, and also passing through the legs of the attachment adjacent the arcuate end are alined openings 9.

When assembled on a gate, there is an attachment 6 connected to and upstanding from each upright 2 or 3. One end of a stringer of barb-wire 15 is connected to the upper end of an end attachment 6 and is then passed through the intermediate attachments 6, and the other end of the wire connected to an eye-bolt 10, which is passed through the attachment 6 at the other end of the gate, and a nut 11 screwed onto the threaded end of said bolt 10, by means of which the wire is pulled up taut. Cotter pins 12 passed through the openings 9 in the intermediate attachments 6 hold the wire up in the arcuate ends of said attachments, and a similar cotter-pin 12 passed through the openings 9 in the attachment to which is connected the eye-bolt 10 will hold the bolt up in the arcuate end of said attachment.

When shipping the attachments, a set is assembled, inserting one into the other; the eye bolt 10 is then passed up through the openings 8 in each attachment and the nut 11 screwed onto the threaded end of the eye-bolt for holding the attachments together.

What I claim is:—

1. In a gate, in combination, a series of panels or boards, a plurality of pairs of uprights connecting said boards, bolts connecting said uprights to said boards, a plurality of barb-wire attachment members, connected to and upstanding from each pair of uprights, each member being of substantially inverted V shape and having alined openings therethrough near the arcuate ends and provided with longitudinal slots opening out of their lower ends and straddling certain of said bolts, a stringer of barb-wire, the end connected to the end attachments and passing through and between the legs of the intermediate attachments, and means passing through the openings in the intermediate attachments for holding the wire up in the arcuate ends of said attachments.

2. A barb-wire attachment for gates, comprising a member of substantially inverted V shape, for the reception of a barb-wire strand between the legs of the member, its upper bent end having an opening therethrough to receive a securing means to secure a plurality of said members in assembled relation for packing, the opposite legs of the member at their lower ends having longitudinal slots for receiving bolts to secure the member to a gate, and the upper ends of the legs adjacent the bend in the member having openings therethrough to receive a securing means to hold the barb-wire strand in the bend of the member.

3. A barb-wire attachment for gates, comprising a member of substantially inverted V shape, formed with an arcuate bend at its upper end to receive a barb-wire strand passing between the legs of the member, the lower ends of the legs of the member having longitudinally arranged slots opening out of the ends of the member to receive securing means for attachment to a gate, and means to hold the strand in the bend of said member.

4. A barb-wire attachment for gates, comprising a member of substantially inverted V shape, formed with an arcuate bend at its upper end to receive a barb-wire strand passing between the legs of the member, the lower ends of the legs of the member having longitudinally arranged slots opening out of the ends of the legs to receive securing means for attachment to a gate, the upper ends of said legs adjacent the arcuate bend having oppositely disposed slots to receive a securing means for holding the strand in the bend between the legs of the member.

In witness whereof I have hereunto affixed my hand this 2d day of September, 1918.

ALVIN V. ROWE.